Figure 1:
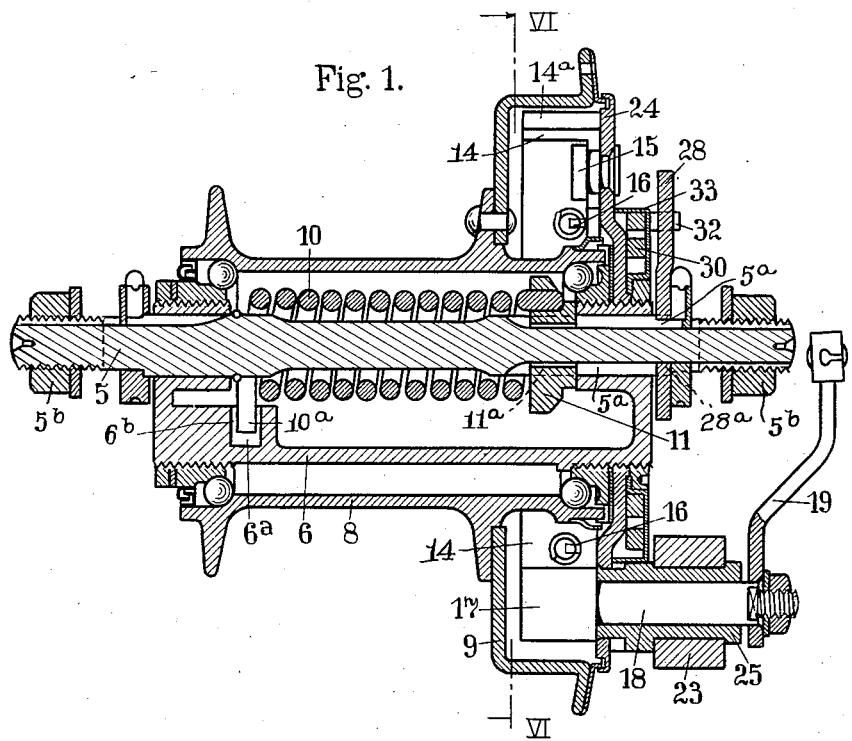

Aug. 27, 1935.  F. WINKLER  2,012,860

SPRING MOUNTED ECCENTRIC HUB WITH BRAKE AND BUFFER SPRING

Filed July 13, 1934   4 Sheets-Sheet 1

Inventor

Franz Winkler
per
Dean Fairbank Hirsch-Foster
his Attys

Aug. 27, 1935.  F. WINKLER  2,012,860
SPRING MOUNTED ECCENTRIC HUB WITH BRAKE AND BUFFER SPRING
Filed July 13, 1934  4 Sheets-Sheet 2
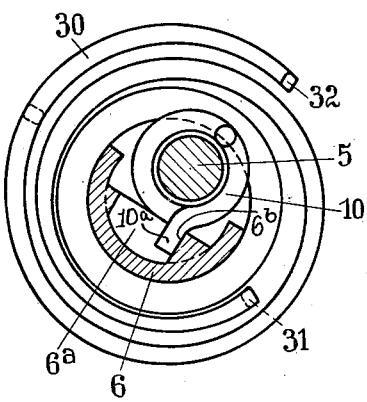
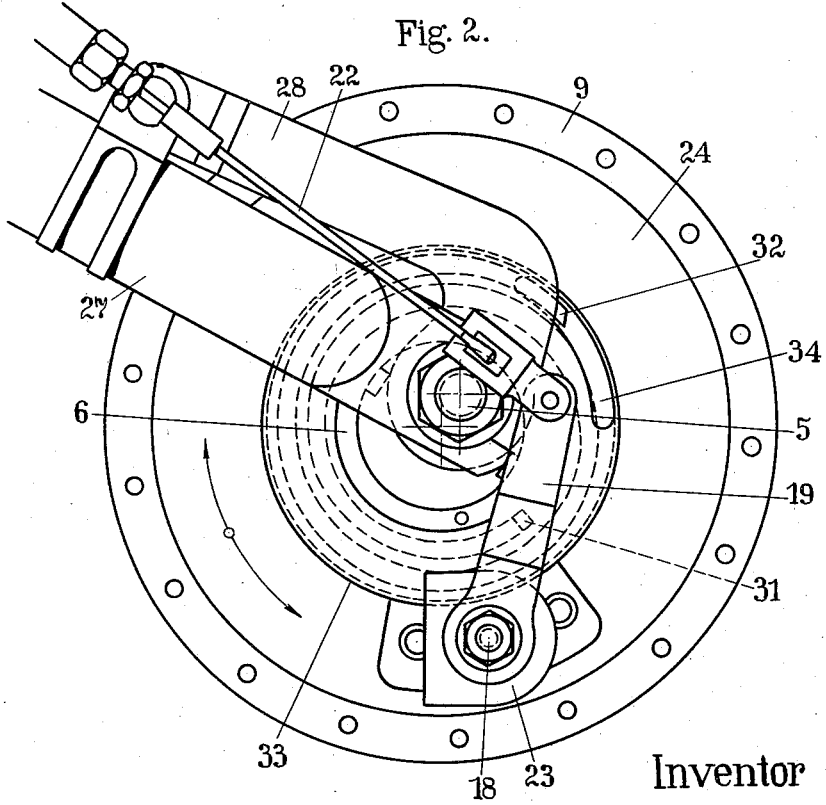

Aug. 27, 1935.  F. WINKLER  2,012,860
SPRING MOUNTED ECCENTRIC HUB WITH BRAKE AND BUFFER SPRING
Filed July 13, 1934  4 Sheets-Sheet 3

Inventor
Franz Winkler

Aug. 27, 1935.　　　　F. WINKLER　　　　2,012,860
SPRING MOUNTED ECCENTRIC HUB WITH BRAKE AND BUFFER SPRING
Filed July 13, 1934　　　4 Sheets-Sheet 4

Inventor

Patented Aug. 27, 1935

2,012,860

UNITED STATES PATENT OFFICE 2,012,860

SPRING-MOUNTED ECCENTRIC HUB WITH BRAKE AND BUFFER SPRING

Franz Winkler, Schweinfurt, Germany

Application July 13, 1934, Serial No. 734,969
In Germany July 18, 1933

8 Claims. (Cl. 208—101)

The invention relates to a wheel hub for bicycles or similar vehicles, which hub is rotatably mounted on a sleeve-like bearing member eccentrically supported on the vehicle axle so as to be allowed to oscillate about the said axle, a shock absorbing spring returning it into its normal position.

The wheel hub is further provided with a brake, parts of which rotate with the hub shell while the stationary elements thereof are rigidly attached to the hub bearer, normally rocking with it but being immobilized during braking by a suitable stop when the supporting spring will be put under high tension.

Resiliently pivoting wheel hubs of this kind are defective in that, when the brake has been released, the supporting spring is permitted to jump the wheel-bearing member back into, and sometimes beyond its neutral position so as to cause the said supporting spring to break owing to the sudden stress in opposite direction.

It is an object of the invention to obviate this inconvenience by checking or diminishing the rebound thus limiting the rocking movement to the desired extent.

This object is attained by the arrangement of a checking spring operative in the opposite direction to that of the supporting spring with the aim gradually to slacken down the return stroke of the wheel hub.

Another object of the invention is so to arrange the buffer spring relatively to the supporting spring that none of them is acted upon in an undue direction in order to prevent them from being overloaded.

To this end a certain play is allowed to either spring at one of its ends which will become operative when the other spring is put under stress.

A further object of the invention is the ready and sure attachment of the buffer spring to the pivotal bearing member and the self detachable connection of its other end to a stationary part of the vehicle frame.

Other objects and advantages will appear in the following specification and the new features attaining same disclosed in the claims.

In the annexed drawings, which form a part of this specification, an embodiment of the rocking hub with a brake and buffer according to the invention is represented, and in these drawings—

Figure 4:
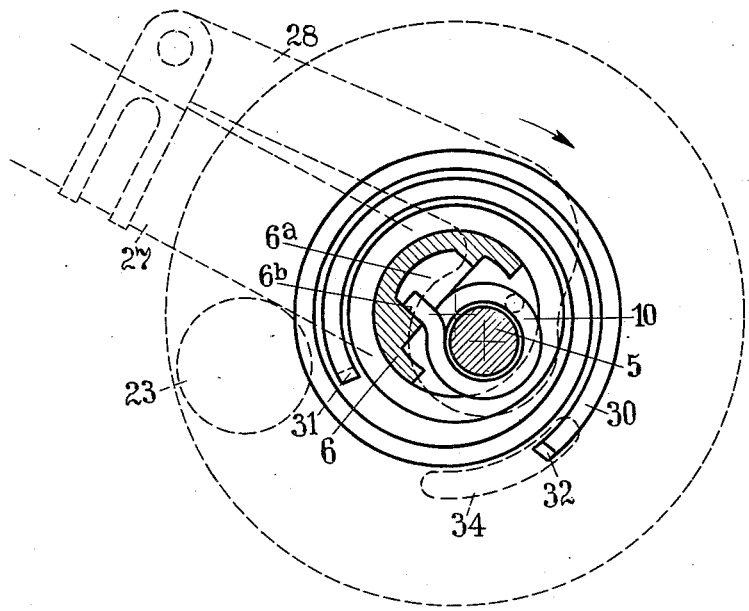
Figure 5:
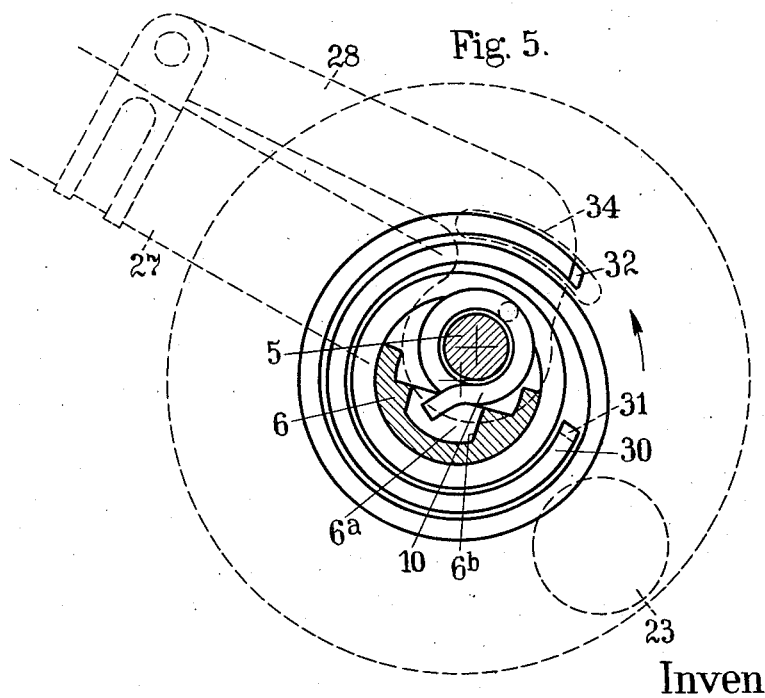
Figure 6:
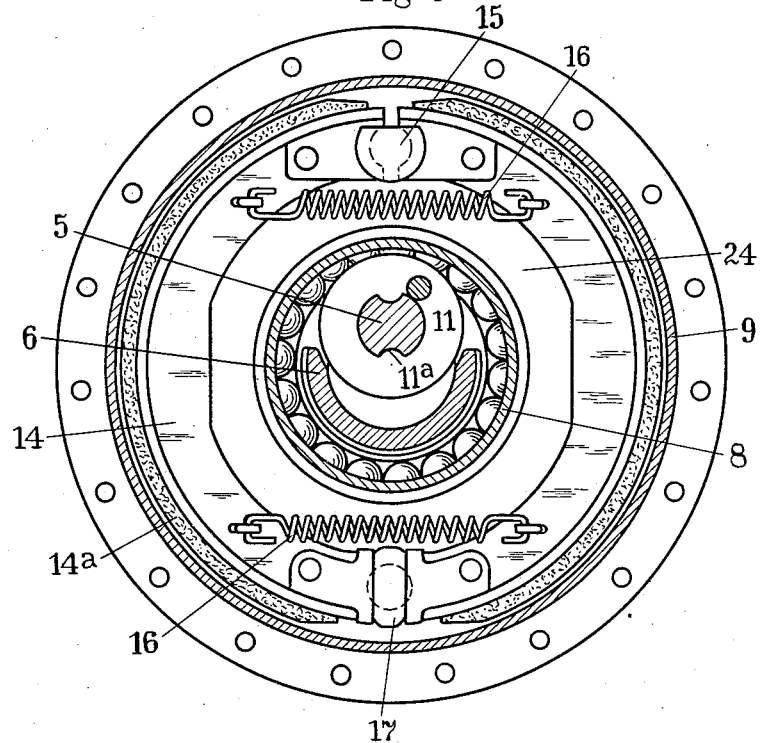
Figure 7:
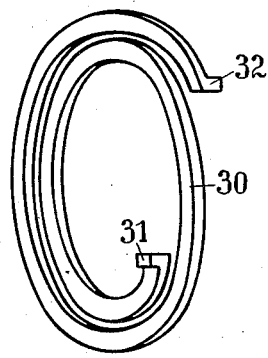

Fig. 1 is a longitudinal sectional elevation of the spring mounted hub with a brake and a buffer spring, Fig. 2 is an end view of the hub and brake, as seen from the right in Fig. 1, Fig. 3 is a cross section of the pivotal bearing member or body, showing the position of the two antagonistic springs relatively to each other and to the bearing member, Fig. 4 is a diagrammatic view, somewhat in section, and showing the springs and other movable parts in extreme braking position, Fig. 5 is a diagrammatic view, somewhat in section, and showing the positions of the members and other movable parts after being released from braking position and acting against the buffer spring, Fig. 6 is a vertical section taken in front of the braking device, and looking towards the end of the hub containing the buffer spring, and Fig. 7 is a perspective view of the buffer spring.

Like numerals designate like parts throughout all figures of the drawings.

The pivotal hub with its brake comprises a bearing member 6 eccentrically mounted on the wheel axle 5, and the hub shell 8 rotatable on the said bearing member, which shell carries the casing 9 of an internal brake. Within the hollow space of the said bearing member a heavy torsion spring 10 intended for acting as a supporting spring is arranged around the axle 5, one end of this spring being engaged into a bore of a ring 11 keyed to the axle 5 by suitable means as for instance keys 11a integral with said axle and extending respectively into the keyways 5a of said axle. The other end 10a of said spring 10 bears on an abutment 6b of the bearing member 6 during the braking and rocking movements (Fig. 3) but with a definite clearance in a recess 6a so that during movement in the contrary direction, viz., when the wheel is jumping back to its normal position, the spring is not strained by being wound up. In the position shown in Fig. 2, the spring takes up the load of the wheel and shocks acting on the wheel inasmuch as the axle 5 rocks up and down forwards with respect to the running direction.

The axle 5 is clamped to the frame fork 27 by the usual nuts 5b shown at the ends of the axle 5 in Fig. 1. The arm 28 has a key 28' integral therewith and engaging one of the axle keyways 5a, thereby preventing the axle 5 from turning.

The brake members lodged in the housing 9 comprise two brake cheeks 14 provided with brake liners 14a and swingably mounted on a pivot 15. These brake cheeks in their inoperative position are kept away from the housing by springs 16. The said pivot is secured to the inner side of a disk 24 mounted on the carrier 6. The brake can be expanded by means of a cam 17 the gudgeon 18 of which is mounted in a sleeve-like bearing 25 disposed on the outside of the brake-supporting disk 24 and carrying a buffer 23 made of rubber or the like, the said gudgeon being provided with a lever 19 to be operated by a Bowden wire 22.

In the unloaded condition of the cycle the buffer 23 has approximately the position shown by Fig. 2. When loaded, the axle descends forwards in the running direction as shown in Fig. 5. Shocks arising from irregularities of the road are taken up by the spring 10, whereby the hub 8 is rocking about the wheel axle 5. When the brake is operated, the wheel continuing its rotation entrains the whole brake and the bearing member 6 positively connected with the disk 24, in the same direction until the buffer 23 strikes the fork 21 as shown in Fig. 4. This rotation of the bearing member 6 about the wheel axle 5 results in an increase of tension of the spring 10. The brake being released, the bearing member 6 is therefore sometimes thrown back by the spring 10 to such an extent that the latter is substantially unwound and caused to break by the counter-stress.

In order that this drawback be avoided, the invention provides for an auxiliary spring 30 which cushions this reaction. At its inner end this spring 30 engages by means of a bend 31 with the brake carrying disk 24 while its outside end bent outwards as at 32 engages the edge of the arm 28. Thus a tension is put on this spring when the bearing body 6 turns counter-clockwise with reference to Fig. 2. A casing 33 enclosing the said spring 30 is provided with a peripheral slot 34 in which the bend 32 is allowed to move. The bearing member 6 being rapidly turned back by the stretched spring 10 so that the wheel may be moved beyond its normal position, the bend or stop 32 which had previously followed the movement of the member 6 and been withdrawn from the arm 28, now returns until it has struck the arm 28 again, so that the spring 30 is put under tension so as to retard the further return movement of the eccentric member 6. As the radially projecting end of the spring 10 is allowed to freely move in the slot 6a of the member 6 the reaction is readily absorbed and the rocking hub brought again into its effective springy position. Thus the spring 10 will not be unduly unwound by jumping back of the hub. The said two springs are stressed in one direction only and given a sufficient play near their end positions.

What is claimed as new, is—

1. In a spring-mounted rocking wheel hub, particularly for cycles, with a supporting spring of helical shape enclosing the wheel axle, a counter-spring intended for retarding the jumping back of the hub on the brake being released.

2. In a spring-mounted rocking wheel hub, particularly for cycles, having a bearing member, a helical supporting spring mounted in said bearing member, a hub shell, a brake housing provided thereon, a spiral counter-spring attached with one end to a part of the brake and with its other end to a stationary part, and a wheel axle received in an eccentric bore of said bearing member.

3. In a spring-mounted rocking wheel hub of the kind described, the combination with a wheel axle, of a bearing member eccentrically mounted thereon, a supporting spring for the said bearing member, and a buffer spring antagonistic thereto adapted to secure the wheel against jumping back.

4. In a spring-mounted rocking wheel hub of the kind described, the combination with a wheel axle, of a bearing body eccentrically mounted thereon, a hub sleeve rotatable on the bearing body, a brake arranged on the hub sleeve and on the bearing body respectively, and antagonistic bearing and buffer springs disposed between the bearing body and stationary parts of the wheel hub.

5. In a spring-mounted rocking wheel hub of the kind described, the combination with a wheel axle, of a bearing body eccentrically mounted thereon, a hub sleeve rotatable on the bearing body, a brake arranged on the hub sleeve and on the bearing body respectively, and antagonistic bearing and buffer springs disposed between the bearing body and stationary parts of the wheel hub, one end of each of said springs having a loose connection with its corresponding abutment to permit limited free play between said spring ends and said abutments.

6. In a spring-mounted rocking wheel hub of the kind described, the combination with an eccentric bearing body, of a spring rockably supporting the said bearing member, a hub sleeve rotatable on said bearing member, a brake disposed between the said hub sleeve and the said bearing member, and a buffer spring antagonistic with respect to the said supporting spring.

7. In a spring-mounted rocking wheel hub of the kind described, the combination with an eccentrically mounted bearing body, of a spring rockably supporting the said bearing member, a hub sleeve rotatable on said bearing member, a brake disposed between the said hub sleeve and the said bearing member, a stop for immobilizing brake elements during braking, and a buffer spring antagonistic with respect to the said supporting spring and acting upon the said bearing member.

8. In a spring-mounted rocking wheel hub of the kind described, the combination with an eccentrically mounted bearing body, of a spring rockably supporting the said bearing member, a hub sleeve rotatable on said bearing member, a brake housing formed on said hub sleeve, brake elements mounted on said bearing member, brake applying means, a stop for temporarily immobilizing the said brake elements and a buffer spring antagonistic with respect to the said supporting spring, one end of the said supporting spring and buffer spring being fixed to rockable parts of the wheel hub and the other end to an abutment with a limited free play.

FRANZ WINKLER.